(No Model.) 2 Sheets—Sheet 2.
J. R. WALLINGFORD & T. FORHAN.
CORN HARVESTER.
No. 512,771. Patented Jan. 16, 1894.
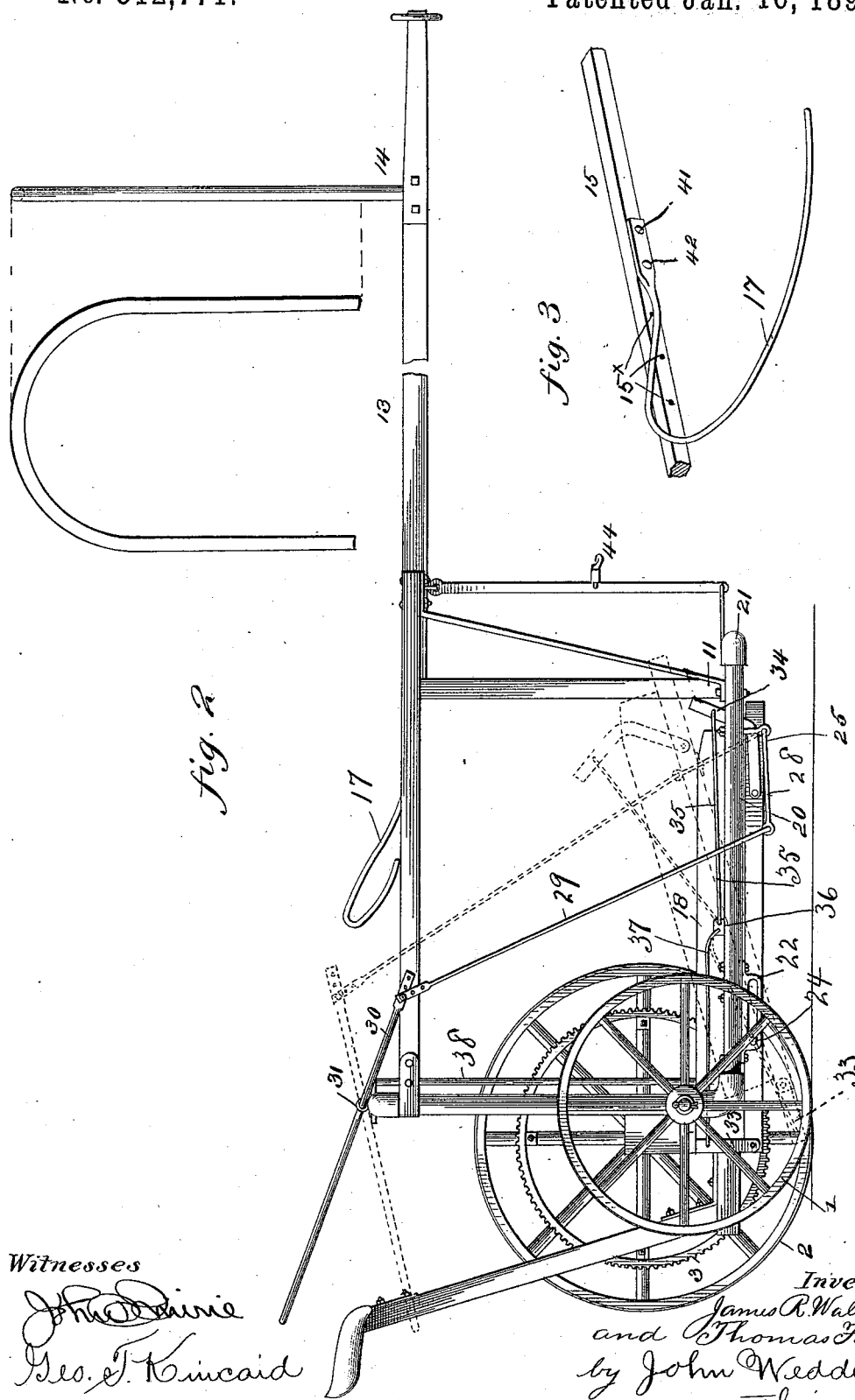
Witnesses
Inventors
James R. Wallingford
and Thomas Forhan
by John Wedderburn
their Att'y

UNITED STATES PATENT OFFICE.

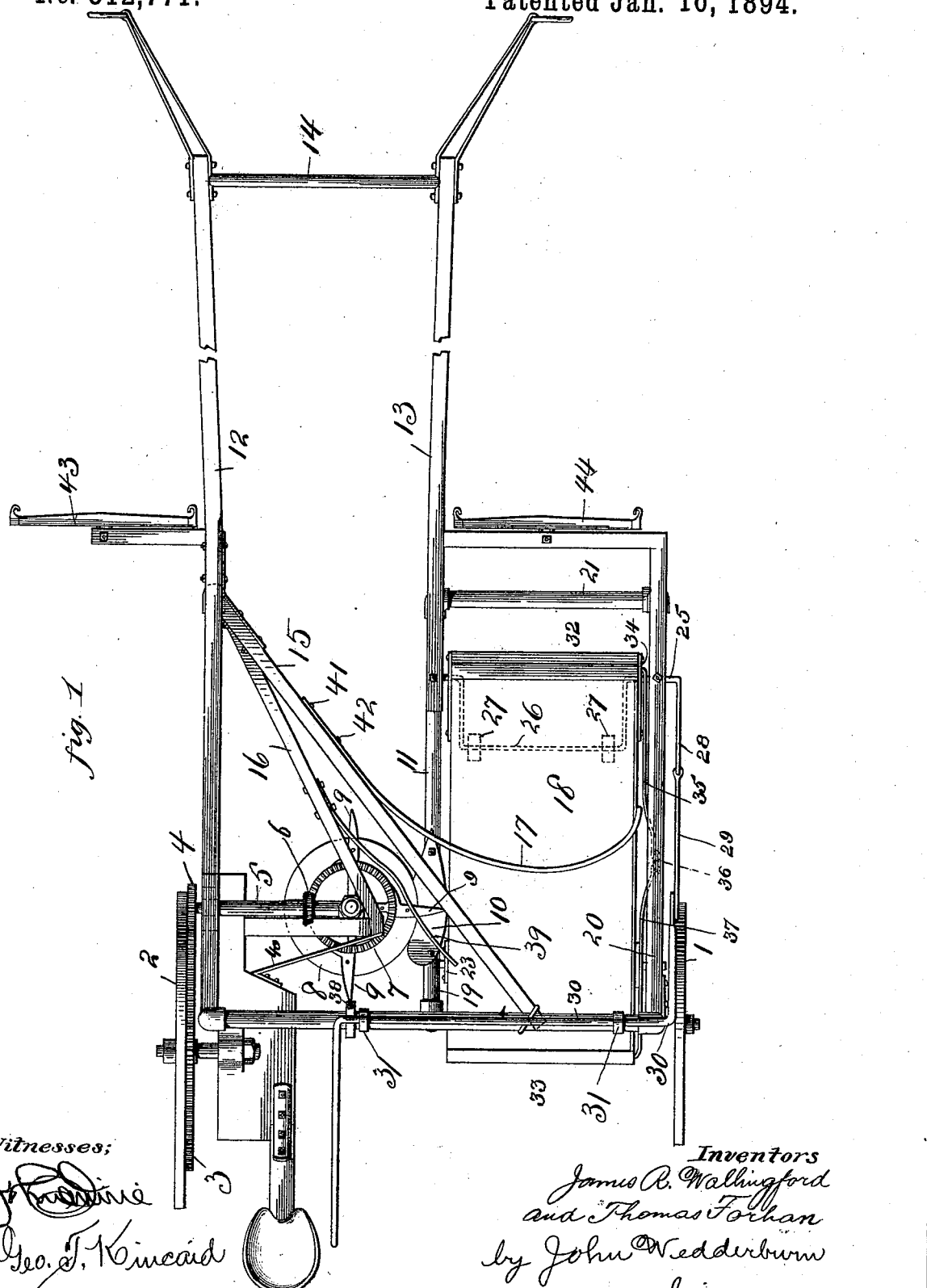

JAMES R. WALLINGFORD AND THOMAS FORHAN, OF CORTLAND, NEBRASKA.

CORN-HARVESTER.

SPECIFICATION forming part of Letters Patent No. 512,771, dated January 16, 1894.

Application filed August 16, 1892. Serial No. 443,259. (No model.)

*To all whom it may concern:*

Be it known that we, JAMES R. WALLINGFORD and THOMAS FORHAN, of Cortland, in the county of Gage and State of Nebraska, have invented certain new and useful Improvements in Corn-Harvesters; and we do hereby declare the following to be a full, clear, and exact description of the invention, such as will enable others skilled in the art to which it appertains to make and use the same.

Our invention relates to an improved form of corn-harvesters, containing improved apparatus for guiding corn stalks into the necessary positions for cutting the stalks; prostrating and lowering the same after cutting, in a pile upon a dump; an improved form of dump; and novel means for discharging the same from the dump.

Our invention more particularly resides in the novel combination, construction and arrangement of parts hereinafter fully specified and pointed out in the claims.

In the accompanying drawings, Figure 1 is a plan view of my corn-harvester. Fig. 2 is a side elevation of same, and Fig. 3 is a detail perspective view of the curved guide arm for throwing the top of the corn stalk into the dump.

The machine is carried upon a small wheel 1 and a large drive-wheel 2, the latter of which carries rigidly secured thereto a cog wheel 3 gearing with a pinion 4, secured upon a shaft 5 rotating in bearings in advance of the drive-wheel, the pinion shaft carrying at its other end a bevel pinion 6, which meshes with a bevel wheel 7, secured to the upper surface of the revolving cutter 8, which cutter revolves in vertical bearings and has gathering fingers 9, which press the corn stalks against a stationary cutter 10 secured to the frame 11. The corn stalk is received between longitudinal frame pieces or tongues 12 and 13 of the machine, which are braced at their front ends by an upright U brace 14, and have oblique guiding pieces 15 and 16. These oblique pieces form an open throat for guiding with more certainty the corn stalks into the position for cutting the same. As the machine moves along, the corn stalk comes against the oblique frame piece 15, which carries a curved rod 17, and guides it to the side of the machine carrying the dump 18. The curved arm 17 is to guide the top of the corn stalk and throw it down into the dump. The dump is carried in a frame consisting of three sides 19, 20, 21 of an oblong, the rear side of the oblong being open. This oblong on the two opposite sides has slotted guides 22 and 23 in which move the guide lugs or pins 24 secured to the bottom of the dump, so that the dump may have a forward and backward motion within the frame. In order to incline the dump downwardly to the rear, there is pivoted a crank shaft 25, rotating in bearings on the dump frame, the double crank 26 of which shaft is secured in eyes 27 below the dump-bottom. One end of the crank shaft is turned to form the crank arm 28 to which is hooked a link 29, which is attached at its upper end to the end of the crank arm on a horizontal rock shaft 30 secured in bearing 31 in the upper part of the frame, which can be rocked by means of a crank handle. The sides of the dump are rigidly secured to the bottom, but the end boards 32 and 33 of the dump are not so secured. The front end 32 is secured by bent irons 34 the ends of which are pivoted on the sides of the bottom of the dump, and the middle of the sides of the front piece are secured by links 35 to a point 36 upon the frame carrying the dump. It thus happens that as the bottom of the dump is raised, the front end is also raised, as in the dotted lines, which serves to give an impetus to the stalks which happen to lie upon the dump. The rear end 33 is hinged at its lower corners to the bottom of the dump, and its upper corners are also secured by curved links 37 to fixed points 36 upon the dump frame. By this arrangement as the bottom of the dump is carried forward, the rear hinged board 33 is brought down into the position shown in the dotted lines, to approximately the same inclination as the dump bottom, thus allowing the corn-stalks to be discharged upon the ground. Thus by the same operation by which the operator depresses the crank-handle, the dump is inclined downward to the rear, the front piece is raised and drawn backward relatively to the dump-bottom, and the rear end is lowered to allow the stalks to slide along the same and be discharged.

Extending backward from the piece 16 is a front cleaner 39, which prevents weeds or other matter from gathering up around the bevel gears, and to the rear of the bevel gears is the back cleaner 40 for the same purpose. The bent rod 17 is capable of being adjusted on the frame 15 by means of the bolts 41 and 42. This adjustment is accomplished by forming the oblique frame piece 15, with a series of transverse openings 15$^\times$ and having the bolts 41 and 42 removable so as to shift the rod 17 farther outwardly or inwardly in accordance with the original position of the same.

The machine is driven in such a manner that the horses walk one on each side of the row of corn-stalks that is being cut, the corn-stalks being received underneath the U brace 14 and between the longitudinal pieces. The horses are attached to the single trees 43 and 44.

The construction and arrangement of the several parts of our machine being thus made known, the operation and the advantages of the same will, it is thought, be readily understood, and it will be seen from the foregoing description that we have provided a very simple and effective corn-harvester, which will have a light draft and by the use of which the corn can be easily cut and deposited.

Having thus fully described our invention, what we claim, and desire to secure by Letters Patent, is—

1. In a corn harvester, the combination of a front cleaner 39, a rear cleaner 40, a stationary knife 10, an oblique frame piece 15 having a series of openings therein and mounted on the upper part of the frame in advance of the said knife, a rod 17 adjustably mounted on said oblique frame piece, and a dump for dumping the corn stalks, which is capable of being operated by a lever, substantially as and for the purposes specified.

2. In a corn harvester of the class described, the combination of a stationary and a revolving cutter, the described means for revolving said cutter, a front cleaner 39, a rear cleaner 40, the oblique pieces 15 and 16 arranged as set forth to form an open throat for guiding the corn stalks to be cut, said piece 15 being formed with a series of openings, a rod 17 adjustably mounted with said piece 15 and having removable attaching bolts, a dump having front and rear movable end pieces, and means for operating said end pieces, substantially as described.

In testimony whereof we have signed this specification in the presence of two subscribing witnesses.

JAMES R. WALLINGFORD.
THOMAS FORHAN.

Witnesses:
CHAS. NAYLOR,
J. C. WARNER.